United States Patent
Shirase (10) Patent No.: US 8,533,368 B2
(45) Date of Patent: Sep. 10, 2013

(54) BUFFERING DEVICE AND BUFFERING METHOD

(75) Inventor: Kenji Shirase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 77 days.

(21) Appl. No.: 12/230,026

(22) Filed: Aug. 21, 2008

(65) Prior Publication Data

US 2008/0320185 A1 Dec. 25, 2008

Related U.S. Application Data

(63) Continuation of application No. PCT/JP2006/303587, filed on Feb. 27, 2006.

(51) Int. Cl.
*G06F 13/18* (2006.01)
(52) U.S. Cl.
USPC .................................. 710/6; 710/19; 710/52
(58) Field of Classification Search
None
See application file for complete search history.

(56) References Cited

U.S. PATENT DOCUMENTS

| | | | | |
|---|---|---|---|---|
| 5,893,151 | A * | 4/1999 | Merchant | 711/140 |
| 6,922,743 | B2 | 7/2005 | Mizuno | |
| 8,115,773 | B2 * | 2/2012 | Swift et al. | 345/522 |
| 2001/0054138 | A1 | 12/2001 | Kawaguchi | |
| 2002/0040421 | A1 | 4/2002 | Muta | |
| 2005/0125634 | A1 | 6/2005 | Ishizuka | |
| 2006/0026399 | A1 | 2/2006 | Miura | |
| 2006/0129764 | A1 * | 6/2006 | Bellows et al. | 711/125 |
| 2006/0179226 | A1 * | 8/2006 | Guthrie et al. | 711/125 |
| 2007/0067549 | A1 * | 3/2007 | Gehman | 710/315 |

FOREIGN PATENT DOCUMENTS

| | | |
|---|---|---|
| JP | 04-190435 A | 7/1992 |
| JP | 10-207831 | 8/1998 |
| JP | 2000-099328 A | 4/2000 |
| JP | 2000-181891 A | 6/2000 |
| JP | 2001-051845 A | 2/2001 |
| JP | 2001-337822 | 12/2001 |
| JP | 2002-108703 A | 4/2002 |
| JP | 2003-242097 A | 8/2003 |
| JP | 2006-040143 A | 2/2006 |
| WO | WO-2004/031944 | 4/2004 |

OTHER PUBLICATIONS

International Search Report for PCT/JP2006/303587, mailed May 30, 2006.
Japan Patent Office: Japanese Office Action mailed Dec. 7, 2010 in corresponding JP Patent Application No. 2008-501569, with English-language translation.
"Japanese Office Action" mailed by JPO and corresponding to Japanese application No. 2008-501569 on Mar. 29, 2011, with English translation.

* cited by examiner

*Primary Examiner* — Ilwoo Park
(74) *Attorney, Agent, or Firm* — Fujitsu Patent Center (57) ABSTRACT

A buffering device buffers data to be subjected to any one of a first process that necessitates a sequential guarantee and a second process that does not necessitate the sequential guarantee, and includes a storage unit that stores therein plurality of target data to be processed; a reading unit that reads the target data from the storage unit one-by-one based on a waiting flag set corresponding to the target data; and a control unit that sets a waiting flag for each of the target data, the waiting flag of a specific target data indicating preceding target data that must be processed before the reading unit reads the specific target data.

5 Claims, 8 Drawing Sheets

| QUEUE NUMBER | REQUEST | STATE | WAITING FLAG | | | | |
|---|---|---|---|---|---|---|---|
| | | | #0 | #1 | #2 | ...... | #7 |
| #0 | | INV | | 0 | 0 | | 0 |
| #1 | | INV | 0 | | 0 | | 0 |
| #2 | | INV | 0 | 0 | | | 0 |
| #3 | | INV | 0 | 0 | 0 | ...... | 0 |
| #4 | | INV | 0 | 0 | 0 | | 0 |
| #5 | | INV | 0 | 0 | 0 | | 0 |
| #6 | | INV | 0 | 0 | 0 | | 0 |
| #7 | | INV | 0 | 0 | 0 | | |

FIG.8

| QUEUE NUMBER | REQUEST | STATE | WAITING FLAG | | | | |
|---|---|---|---|---|---|---|---|
| | | | #0 | #1 | #2 | ...... | #7 |
| #0 | s1 | PR | | 0 | 0 | | 0 |
| #1 | | INV | 0 | | 0 | | 0 |
| #2 | | INV | 0 | 0 | | | 0 |
| #3 | | INV | 0 | 0 | 0 | ...... | 0 |
| #4 | | INV | 0 | 0 | 0 | | 0 |
| #5 | | INV | 0 | 0 | 0 | | 0 |
| #6 | | INV | 0 | 0 | 0 | | 0 |
| #7 | | INV | 0 | 0 | 0 | | |

FIG.9

| QUEUE NUMBER | REQUEST | STATE | WAITING FLAG | | | | |
|---|---|---|---|---|---|---|---|
| | | | #0 | #1 | #2 | ...... | #7 |
| #0 | s1 | SR | | 0 | 0 | | 0 |
| #1 | w1 | PR | 0 | | 0 | | 0 |
| #2 | | INV | 0 | 0 | | | 0 |
| #3 | | INV | 0 | 0 | 0 | ...... | 0 |
| #4 | | INV | 0 | 0 | 0 | | 0 |
| #5 | | INV | 0 | 0 | 0 | | 0 |
| #6 | | INV | 0 | 0 | 0 | | 0 |
| #7 | | INV | 0 | 0 | 0 | | |

FIG.10

| QUEUE NUMBER | REQUEST | STATE | WAITING FLAG | | | | |
|---|---|---|---|---|---|---|---|
| | | | #0 | #1 | #2 | ...... | #7 |
| #0 | s1 | SR | | 0 | 0 | | 0 |
| #1 | w1 | SR | 1 | | 0 | | 0 |
| #2 | s2 | PR | 1 | 1 | | ...... | 0 |
| #3 | | INV | 0 | 0 | 0 | | 0 |
| #4 | | INV | 0 | 0 | 0 | | 0 |
| #5 | | INV | 0 | 0 | 0 | | 0 |
| #6 | | INV | 0 | 0 | 0 | | 0 |
| #7 | | INV | 0 | 0 | 0 | | |

FIG.11

| QUEUE NUMBER | REQUEST | STATE | WAITING FLAG | | | | |
|---|---|---|---|---|---|---|---|
| | | | #0 | #1 | #2 | ...... | #7 |
| #0 | s1 | RA | | 0 | 0 | | 0 |
| #1 | w1 | SR | 0 | | 0 | | 0 |
| #2 | s2 | PR | 1 | 1 | | ...... | 0 |
| #3 | w2 | PR | 0 | 0 | 0 | | 0 |
| #4 | | INV | 0 | 0 | 0 | | 0 |
| #5 | | INV | 0 | 0 | 0 | | 0 |
| #6 | | INV | 0 | 0 | 0 | | 0 |
| #7 | | INV | 0 | 0 | 0 | | |

FIG.12

| QUEUE NUMBER | REQUEST | STATE | WAITING FLAG | | | | |
|---|---|---|---|---|---|---|---|
| | | | #0 | #1 | #2 | ...... | #7 |
| #0 | s1 | RA | | 0 | 0 | | 0 |
| #1 | w1 | SR | 0 | | 0 | | 0 |
| #2 | s2 | PR | 1 | 1 | | ...... | 0 |
| #3 | w2 | SR | 0 | 1 | 0 | | 0 |
| #4 | | INV | 0 | 0 | 0 | | 0 |
| #5 | | INV | 0 | 0 | 0 | | 0 |
| #6 | | INV | 0 | 0 | 0 | | 0 |
| #7 | | INV | 0 | 0 | 0 | | |

FIG.13

| QUEUE NUMBER | REQUEST | STATE | WAITING FLAG | | | | |
|---|---|---|---|---|---|---|---|
| | | | #0 | #1 | #2 | ...... | #7 |
| #0 | s1 | RA | — | 0 | 0 | | 0 |
| #1 | w1 | RA | 0 | — | 0 | | 0 |
| #2 | s2 | PR | 1 | 1 | — | ...... | 0 |
| #3 | w2 | SR | 0 | 0 | 0 | | 0 |
| #4 | | INV | 0 | 0 | 0 | | 0 |
| #5 | | INV | 0 | 0 | 0 | | 0 |
| #6 | | INV | 0 | 0 | 0 | | 0 |
| #7 | | INV | 0 | 0 | 0 | | — |

FIG.14

| QUEUE NUMBER | REQUEST | STATE | WAITING FLAG | | | | |
|---|---|---|---|---|---|---|---|
| | | | #0 | #1 | #2 | ...... | #7 |
| #0 | s1 | RA | — | 0 | 0 | | 0 |
| #1 | | INV | 0 | — | 0 | | 0 |
| #2 | s2 | PR | 1 | 0 | — | ...... | 0 |
| #3 | w2 | RA | 0 | 0 | 0 | | 0 |
| #4 | | INV | 0 | 0 | 0 | | 0 |
| #5 | | INV | 0 | 0 | 0 | | 0 |
| #6 | | INV | 0 | 0 | 0 | | 0 |
| #7 | | INV | 0 | 0 | 0 | | — |

FIG.15

| QUEUE NUMBER | REQUEST | STATE | WAITING FLAG | | | | |
|---|---|---|---|---|---|---|---|
| | | | #0 | #1 | #2 | ...... | #7 |
| #0 | | INV | — | 0 | 0 | | 0 |
| #1 | | INV | 0 | — | 0 | | 0 |
| #2 | s2 | PR | 0 | 0 | — | ...... | 0 |
| #3 | w2 | RA | 0 | 0 | 0 | | 0 |
| #4 | | INV | 0 | 0 | 0 | | 0 |
| #5 | | INV | 0 | 0 | 0 | | 0 |
| #6 | | INV | 0 | 0 | 0 | | 0 |
| #7 | | INV | 0 | 0 | 0 | | — |

FIG.16

| QUEUE NUMBER | REQUEST | STATE | WAITING FLAG | | | | |
|---|---|---|---|---|---|---|---|
| | | | #0 | #1 | #2 | ...... | #7 |
| #0 | | INV | | 0 | 0 | | 0 |
| #1 | | INV | 0 | | 0 | | 0 |
| #2 | s2 | SR | 0 | 0 | | ...... | 0 |
| #3 | w2 | RA | 0 | 0 | 0 | | 0 |
| #4 | | INV | 0 | 0 | 0 | | 0 |
| #5 | | INV | 0 | 0 | 0 | | 0 |
| #6 | | INV | 0 | 0 | 0 | | 0 |
| #7 | | INV | 0 | 0 | 0 | | |

FIG.17

| QUEUE NUMBER | REQUEST | STATE | WAITING FLAG | | | | |
|---|---|---|---|---|---|---|---|
| | | | #0 | #1 | #2 | ...... | #7 |
| #0 | | INV | | 0 | 0 | | 0 |
| #1 | | INV | 0 | | 0 | | 0 |
| #2 | s2 | RA | 0 | 0 | | ...... | 0 |
| #3 | | INV | 0 | 0 | 0 | | 0 |
| #4 | | INV | 0 | 0 | 0 | | 0 |
| #5 | | INV | 0 | 0 | 0 | | 0 |
| #6 | | INV | 0 | 0 | 0 | | 0 |
| #7 | | INV | 0 | 0 | 0 | | |

FIG.18

| QUEUE NUMBER | REQUEST | STATE | WAITING FLAG | | | | |
|---|---|---|---|---|---|---|---|
| | | | #0 | #1 | #2 | ...... | #7 |
| #0 | | INV | | 0 | 0 | | 0 |
| #1 | | INV | 0 | | 0 | | 0 |
| #2 | | INV | 0 | 0 | | ...... | 0 |
| #3 | | INV | 0 | 0 | 0 | | 0 |
| #4 | | INV | 0 | 0 | 0 | | 0 |
| #5 | | INV | 0 | 0 | 0 | | 0 |
| #6 | | INV | 0 | 0 | 0 | | 0 |
| #7 | | INV | 0 | 0 | 0 | | |

BUFFERING DEVICE AND BUFFERING METHOD

CROSS REFERENCE TO RELATED APPLICATIONS

This is a continuing application, filed under 35 U.S.C. §111(a), of International Application PCT/JP2006/303587, filed Feb. 27, 2006, the contents of which are incorporated herein by reference.

BACKGROUND OF THE INVENTION

1. Field of the Invention

The present invention relates to a buffering device and a buffering method.

2. Description of the Related Art

Generally, processes to be executed by data processors such as computers include a process that necessitates a sequential guarantee and a process that does not necessitate the sequential guarantee. In the process that necessitates the sequential guarantee, a next process is not executed until a previous process is completed. By contrast, in the process that does not necessitate the sequential guarantee, two or more processes are executed in parallel if the processes are executable.

If the two types of processes are to be executed in a single data processor, intermediating a sequence of the processes is necessary. For example, Japanese Patent Application Laid-open No. H10-207831 discloses a technology for intermediating the processes such that process target data is classified and temporarily stored in a plurality of buffers, and the data is read from any one of the buffers based on priority of order and the sequence of the processes.

However, when using the multiple buffers for the sequential guarantee, a circuit scale disadvantageously increases. In other words, if the process that necessitates the sequential guarantee and the process that does not necessitate the sequential guarantee are to be executed in a single processor, different buffers are needed for the processes, respectively. For example, at least one buffer is needed for the process target data that necessitates the sequential guarantee and another buffer is needed for the process target data that does not necessitate the sequential guarantee. Thus, a circuit that forms the buffers becomes complex and its scale disadvantageously increases.

SUMMARY

It is an object of the present invention to at least partially solve the problems in the conventional technology.

According to an aspect of the present invention, there is provided a buffering device that buffers data to be subjected to any one of a first process that necessitates a sequential guarantee and a second process that does not necessitate the sequential guarantee, and includes a storage unit that stores therein plurality of target data to be processed; a reading unit that reads the target data from the storage unit one-by-one based on a waiting flag set to the target data; and a control unit that sets the waiting flag to each of the target data, the waiting flag of a specific target data indicating preceding target data that is be processed before processing the specific target data.

According to another aspect of the present invention, there is provided a method of buffering data to be subjected to any one of a first process that necessitates a sequential guarantee and a second process that does not necessitate the sequential guarantee, and including storing a plurality of target data to be processed; setting a waiting flag to each of the target data, the waiting flag of a specific target data indicating preceding target data that is be processed before processing the specific target data; controlling an order of reading of the target data based on the waiting flag set corresponding to the target data; and reading the target data one-by-one in the order controlled at the controlling.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below with reference to the accompanying drawings. Issuing of a request in a data processor is explained below as an example. However, the present invention can also be applied to buffering in a transfer of an asynchronous transfer mode (ATM).

Figure 1:
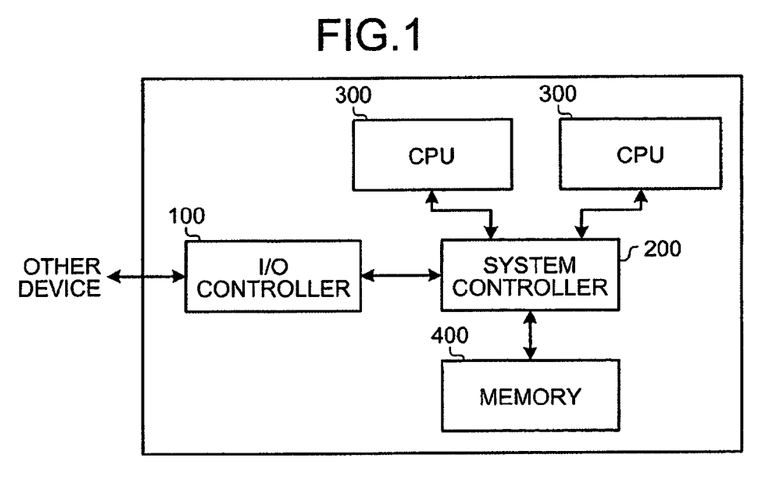
FIG. 1 is a block diagram of a data processor according to an embodiment of the present invention.

FIG. 1 is a block diagram of a data processor according to an embodiment of the present invention. The data processor shown in FIG. 1 includes an input/output (I/O) controller 100, a system controller 200, central processing units (CPU) 300, and a memory 400.

The I/O controller 100 controls input and output of data between the data processor and another device. To be specific, the I/O controller 100 outputs to the system controller 200 requests for various process requests that are output from the other device. When outputting the requests, for a request that necessitates a sequential guarantee, the I/O controller 100 outputs the request after issuing completion of a request (hereinafter, "previous request") that is input into the I/O controller 100 before the request. The other device, which is an issuing source of the request, can be inside the data processor or outside the data processor. For example, the I/O controller 100 and the other device are connected by a peripheral component interconnect (PCI) express etc. Furthermore, the other device that issues the request is not limited to a single device, and various requests can also be issued from a plurality of other devices.

The system controller 200 controls the CPU 300 and the memory 400. The system controller 200 outputs the request from the other device to the CPU 300 and outputs via the I/O controller 100, a result of a calculation process to the other device that is the issuing source.

The CPU 300 reads programs and data that are stored in the memory 400, executes a calculation process, and outputs the result of the calculation process to the system controller 200. The data processor shown in FIG. 1 includes the two CPUs 300. However, the data processor can include only a single CPU 300 or three or more CPUs 300.

The memory 400 stores therein the programs and the data that are used by the CPU 300. The memory 400 includes a plurality of dual inline memory modules (DIMM).

Figure 2:
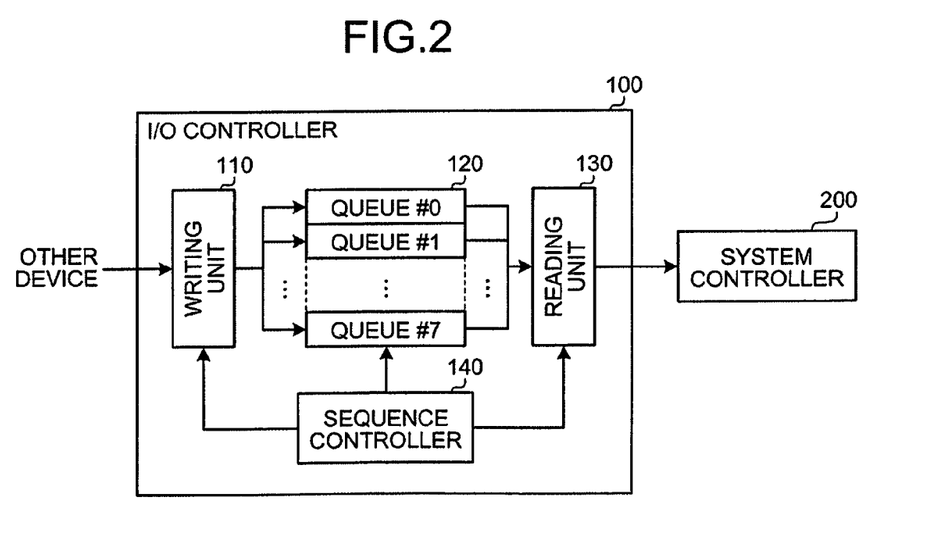
FIG. 2 is a block diagram of an I/O controller shown in FIG. 1.

FIG. 2 is a block diagram of the I/O controller 100. Only the portions of the I/O controller 100 that are related to an output of the request are shown in FIG. 2. The I/O controller 100 includes a writing unit 110, a buffer 120, a reading unit 130, and a sequence controller 140.

The writing unit 110 writes the request, which is output from the other device, to any one of empty queues inside the buffer 120. When writing the request, the writing unit 110 adds state data and waiting flag data of the request according to an instruction from the sequence controller 140 and writes the resulting entry to the empty queue.

Figure 3:
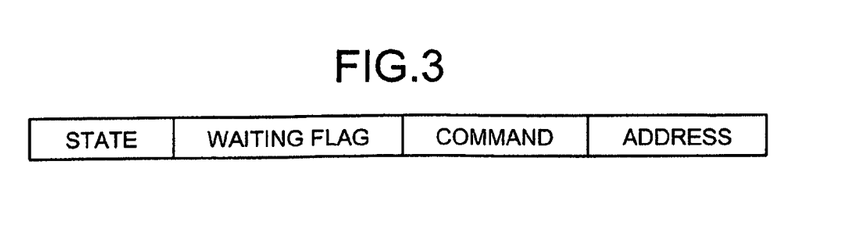
FIG. 3 is a schematic of an example of an entry in a queue according to the embodiment.

As shown in FIG. 3, in a format of an entry, a state and a waiting flag are added to a command and an address that correspond to the request. The state indicates a status of the request. Four types of the state include a status in which issuing of the previous request is awaited (hereinafter, "PR"), a status in which issuing of the request itself is awaited (hereinafter, "SR"), a status in which a receipt response from the system controller 200 is awaited (hereinafter, "RA"), and a status in which issuing of the request is completed and the request is invalidated (hereinafter, "INV"). The state changes in a sequence of PR, SR, RA, and INV. The waiting flag indicates a request, an issuing completion of which needs to be awaited by the respective request. For example, if the request stored in a queue #1 needs to await the issuing completion of the request stored in a queue #0, a flag of the queue #0 is raised in the waiting flag of the request of the queue #1.

The buffer 120 includes a storage space that can store therein a plurality of requests. The buffer 120 is divided into a plurality of queues (eight queues in FIG. 2) that are areas that store therein a single request. The queues #0 to #7 inside the buffer 120 store therein the entries in which the state data and the waiting flag data are added to the request, respectively.

According to the instruction from the sequence controller 140, the reading unit 130 reads the request that is included in the entry from any one of the queues #0 to #7 inside the buffer 120 and outputs the read request to the system controller 200.

When a new request is input into the writing unit 110 from the other device, the sequence controller 140 treats the state of the request as "PR", sets the waiting flag according to a type of the request and existence or absence of the previous request, and instructs the writing unit 110 to write the entry to the empty queue inside the buffer 120. Further, the sequence controller 140 refers to the state and the waiting flag of the queues #0 to #7 and instructs the reading unit 130, while controlling an issuing sequence of the requests that are stored in the respective queues #0 to #7, to read the request. Next, when the state and the waiting flag of the request change along with reading of the request, the sequence controller 140 causes the writing unit 110 to rewrite the state data and the waiting flag data of the respective entries in the queues #0 to #7 inside the buffer 120. Control of a specific request issuing sequence by the sequence controller 140 will be explained later.

Figure 4:
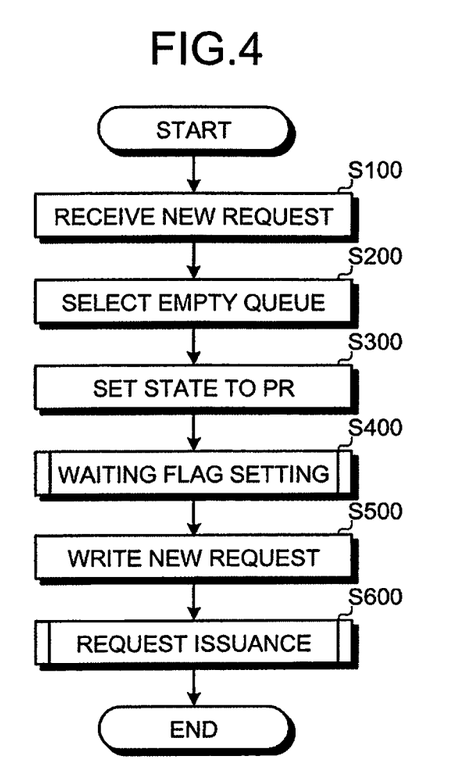
FIG. 4 is a flowchart of an operation performed by the I/O controller shown in FIG. 2.
Figure 5:
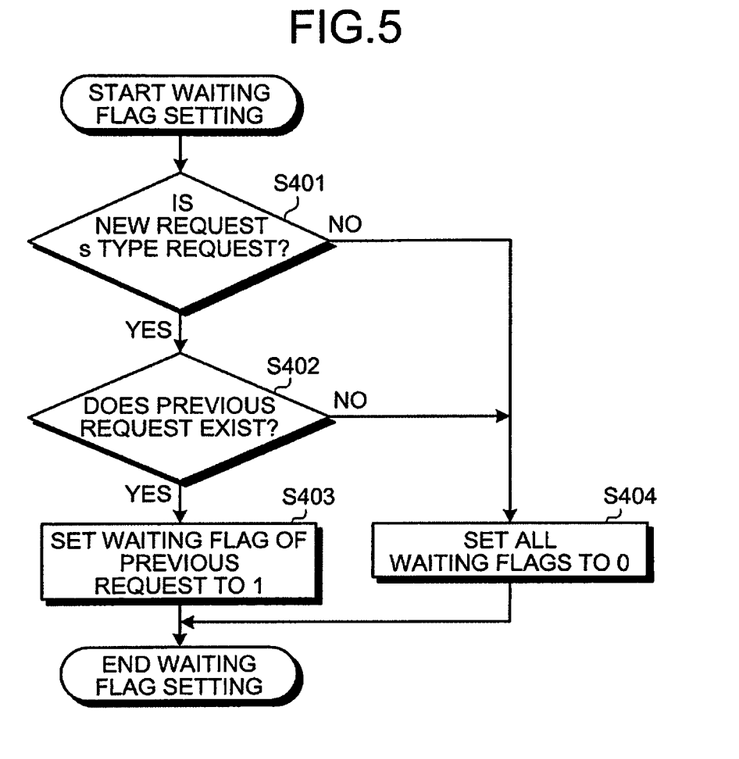
FIG. 5 is a flowchart of a setting operation of a waiting flag according to the embodiment.
Figure 6:
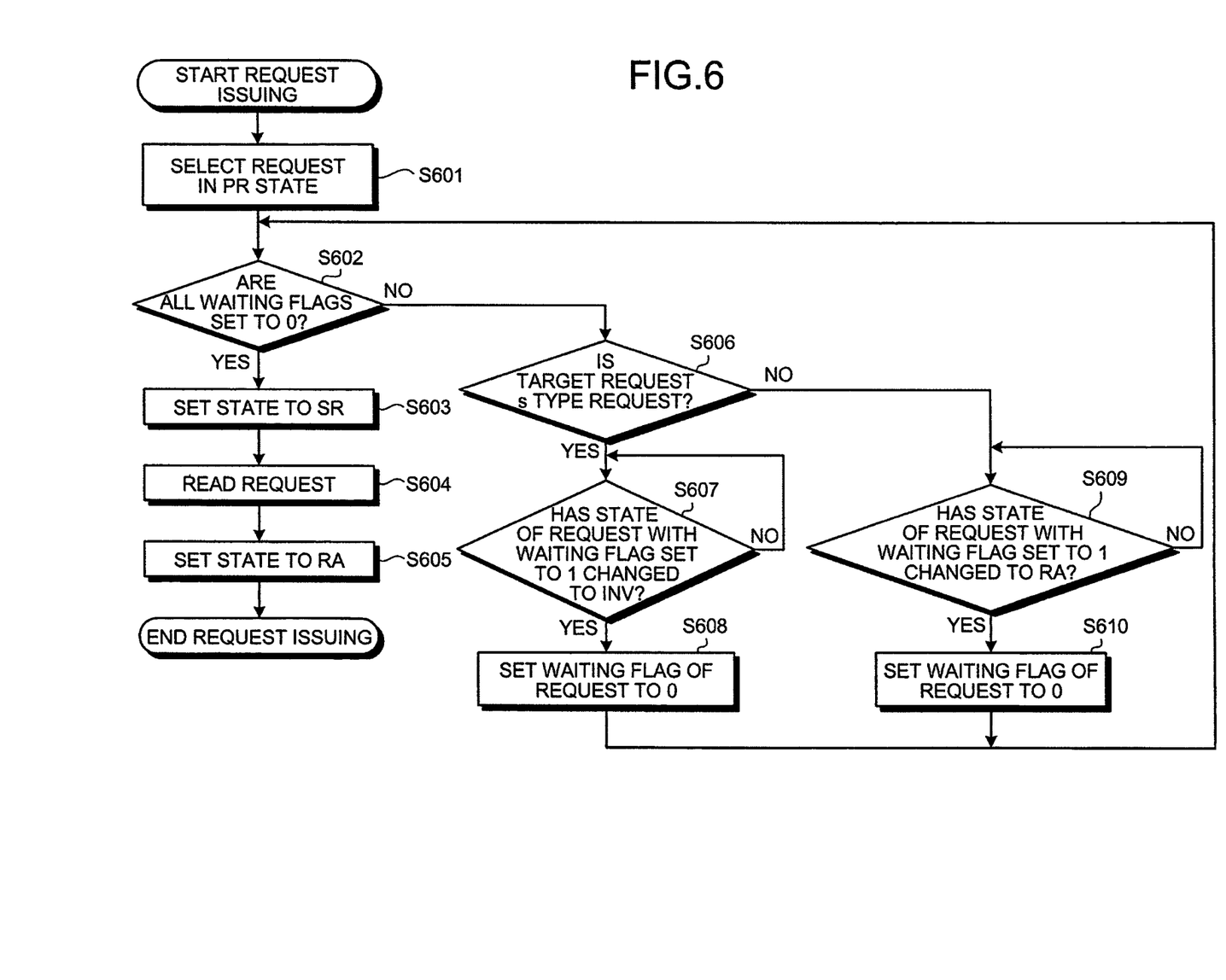
FIG. 6 is a flowchart of a request issuing operation according to the embodiment.

An operation of the I/O controller 100 having the above structure is explained below with reference to flowcharts shown in FIGS. 4 to 6.

Upon the writing unit 110 inside the I/O controller 100 receiving the new request that is output from the other device (Step S100), the sequence controller 140 selects an empty queue from the queues #0 to #7 inside the buffer 120 (Step S200). The empty queue indicates a queue that does not include a stored entry or a queue that includes an entry in INV state. If the entry is in INV state, because issuing of the corresponding request is already completed and the receipt response from the system controller 200 is also returned, the request is invalidated and can be treated as non-existing. If multiple queues are empty, the sequence controller 140 can select a random queue. For example, the sequence controller 140 selects an empty queue of the lowest number as the queue for the new request.

Next, the sequence controller 140 instructs the writing unit 110 to set the state of the new request to PR (Step S300). The state of the new request is set to PR that indicates that the new request is constantly awaiting issuing of the previous request. If all the previous requests are already issued or the previous request does not exist, after the new request is written to the queue, the sequence controller 140 causes the writing unit 110 to rewrite the state of the request to SR that indicates that the new request is awaiting issuing of the new request itself.

After the writing unit 110 has set the state of the new request, the sequence controller 140 determines the waiting flag of the request and causes the writing unit 110 to set the waiting flag (Step S400). Setting of the waiting flag is carried out according to a flowchart shown in FIG. 5.

In other words, the sequence controller 140 determines whether the new request is an s (strong order) type request that necessitates the sequential guarantee or a w (weak order) type request that does not necessitate the sequential guarantee (Step S401). If the new request is the w type request (No at Step S401), because the request does not need to await the issuing completion of the previous request, the waiting flags corresponding to all the queues are set to zero that indicates that waiting is not required (Step S404).

If the new request is the s type request (Yes at Step S401), because the request needs to await the issuing completion of the previous request, the sequence controller 140 determines whether a previous request exists in any of the queues #0 to #7 inside the buffer 120 (Step S402). If a previous request does not exist in any of the queues #0 to #7 (No at Step S402), the sequence controller 140 sets all the waiting flags to zero (Step S404). If a previous request exists in any one of the queues #0 to #7 (Yes at Step S402), the waiting flag of the queue corresponding to the previous request is set by the sequence controller 140 to 1 that indicates that waiting is required (Step S403).

Thus, upon the new request being output from the other device, the sequence controller 140 sets the waiting flag based on the type of the new request and existence or absence of the previous request, thereby the sequence controller 140 can determine, only from the waiting flag, whether the request can be issued at the time of writing the request to the respective queue in the buffer 120.

Referring back to FIG. 4, after setting the state and the waiting flag of the new request, the writing unit 110 writes the entry, which includes the state data and the waiting flag data that are added to the new request, to the empty queue that is selected by the sequence controller 140 inside the buffer 120 (Step S500). Next, the sequence controller 140 determines the issuing sequence of the requests in the queues #0 to #7 and the requests are read and executed by the reading unit 130 according to the decided issuing sequence (Step S600). To be specific, the requests are issued by the sequence controller 140 and the reading unit 130 that operate according to a flowchart shown in FIG. 6.

In other words, the sequence controller 140 selects the request that is stored in the queues #0 to #7 inside the buffer 120 and that is set to PR state (Step S601). If multiple requests are set to PR state, the sequence controller 140 selects the request of the lowest number. Next, the sequence controller 140 confirms the waiting flag of the selected issuing target request and determines whether all the waiting flags are set to zero (Step S602).

If all the waiting flags are set to zero (Yes at Step S602), because the issuing target request does not need to await issuing of the previous request, the sequence controller 140 sets the state of the issuing target request to SR that indicates that issuing of the request is awaited (Step S603). The reading unit 130 reads the request upon opening of a transmission path between the I/O controller 100 and the system controller 200 (Step S604) and the request is output to the system controller 200. The sequence controller 140 rewrites the state of the read request, which is read from the buffer 120, to RA that indicates that the receipt response is awaited (Step S605). Upon the system controller 200 returning the receipt response (ACK) to the I/O controller 100, the sequence controller 140 rewrites the state of the read request, which is read from the buffer 120, to INV that indicates invalidation. Thus, issuing of the issuing target request is completed.

If the waiting flags of the issuing target request include 1 (No at Step S602), the sequence controller 140 confirms whether the request is the s type request (Step S606). If the issuing target request is the s type request (Yes at Step S606), the sequence controller 140 issues the request that is indicated by the waiting flag set to 1 and monitors whether the state of the request has changed to INV (Step S607). When the state of the request, which includes the waiting flag set to 1, changes to INV (Yes at Step S607), because the issuing of the previous request that necessitated waiting for the issuing completion is completed, the sequence controller 140 causes the writing unit 110 to rewrite to zero, the waiting flag of the previous request in the waiting flags of the issuing target request (Step S608) and determines whether all the waiting flags are set to zero (Step S602).

If the issuing target request is the w type request (No at Step S606), the reading unit 130 reads the request that is indicated by the waiting flag set to 1 and the sequence controller 140 monitors whether the state of the request has changed to RA (Step S609). When the state of the request, which is indicated by the waiting flag that is set to 1, changes to RA (Yes at Step S609), because the previous request ceases to occupy the transmission path, the sequence controller 140 causes the writing unit 110 to rewrite to zero, the waiting flag of the previous request in the waiting flags of the issuing target request (Step S610) and determines whether all the waiting flags are set to zero (Step S602).

The process mentioned earlier is repeated until all the waiting flags among the waiting flags of the issuing target request are set to zero. When all the previous requests are output to the system controller 200 and all the waiting flags are set to zero, the issuing target request is issued and the state of the issuing target request is sequentially rewritten to RA and INV. When the state of the issuing target request changes to RA, the waiting flag of the issuing target request, among the waiting flags of the next w type request, is rewritten to zero. Further, when the state of the issuing target request changes to INV, the waiting flag of the issuing target request, among the waiting flags of the next s type request, is rewritten to zero.

The request issuing sequence according to the present embodiment is explained below with a specific example. In the example explained below, an s type request s1, a w type request w1, an s type request s2, and a w type request w2 are sequentially output from the other device.

Figure 7:
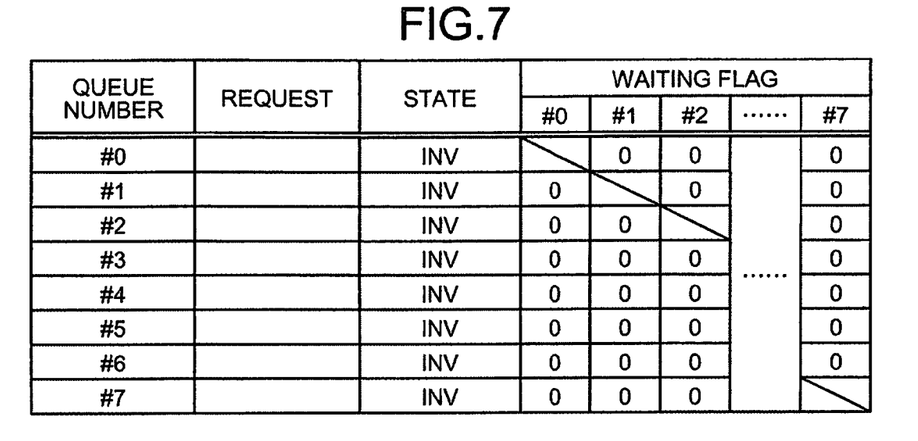
FIGS. 7 to 18 are tables of a specific example of a list of the waiting flags according to the embodiment.

FIG. 7 is a table of the waiting flags when all the queues #0 to #7 inside the buffer 120 are empty. In other words, in the table shown in FIG. 7, the waiting flags in the respective queues indicate that the state of the requests that are stored in all the queues #0 to #7 is INV. In the table shown in FIG. 7, because a valid request is not stored in any of the queues #0 to #7, all the waiting flags among the waiting flags of all the queues #0 to #7 are set to zero.

Figure 8:
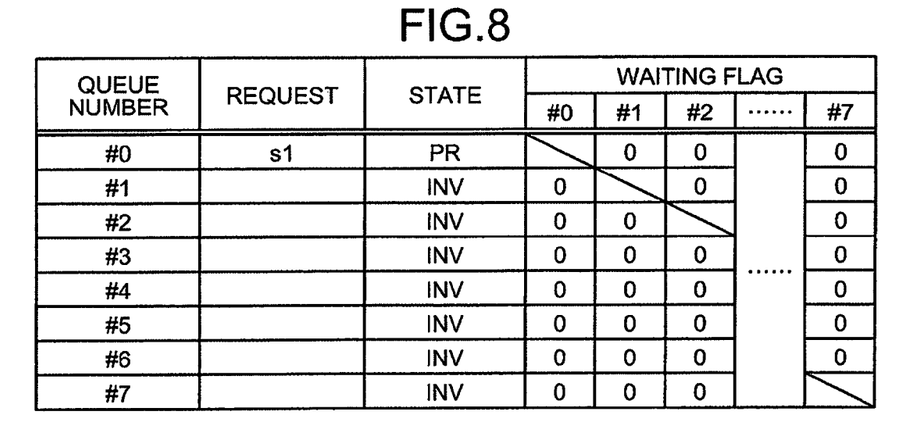

When the request s1 is output from the other device as a new request, the writing unit 110 writes the request s1 to the queue #0. The state of the request s1 is PR that indicates that issuing of the previous request is awaited. Because a previous request does not exist when the request s1 is stored, all the waiting flags among the waiting flags of the request s1 are set to zero. The status mentioned earlier is shown in FIG. 8.

Figure 9:
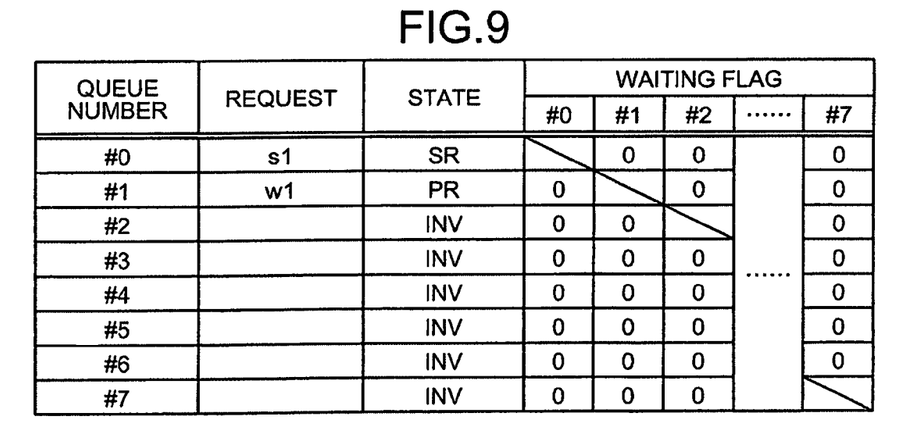

Next, when the request w1 is output as a new request from the other device, the writing unit 110 writes the request w1 to the queue #1. The state of the request w1 is written as PR. Further, the state of the request s1, which is the previous request, is changed to SR that indicates that issuing of the request s1 itself is awaited. The status mentioned earlier is shown in FIG. 9.

Figure 10:
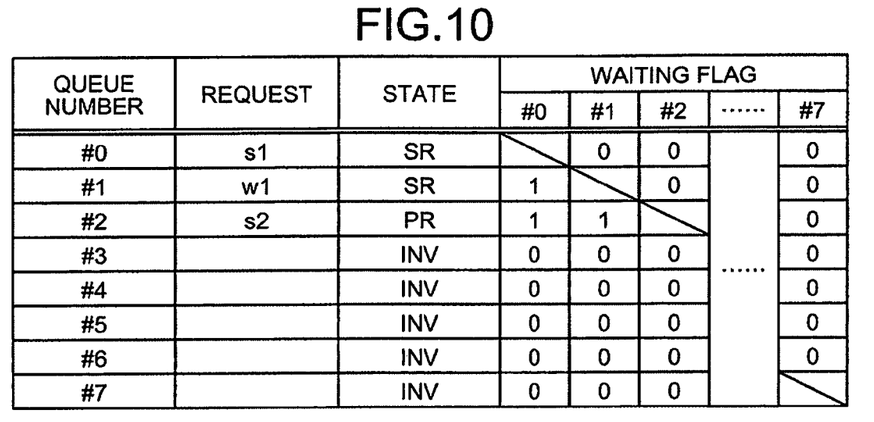

When the request s2 is output as a new request from the other device, the writing unit 110 writes the request s2 to a queue #2. The state of the request s2 is written as PR. Further, because the requests s1 and wi are already stored in the queues #0 and #1 respectively when the request s2 is written to the queue #2, among the waiting flags of the request s2, the waiting flags of the queues #0 and #1, corresponding to the requests s1 and w1 respectively, are set to 1. Further, because the request w1 does not need to await the issuing completion of the request s1, the state of the request w1 is rewritten to SR. However, because the transmission path is occupied by the previous request s1, among the waiting flags of the request w1, the waiting flag of the queue #0 corresponding to the request s1 is set to 1. The status mentioned earlier is shown in FIG. 10.

Figure 11:
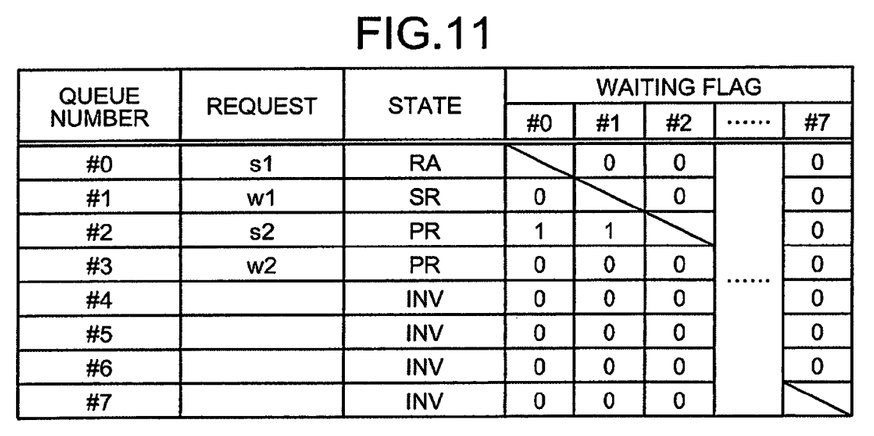

When the request w2 is output as a new request from the other device, the writing unit 110 writes the request w2 to a queue #3. The state of the request w2 is written as PR. The request s1 is output to the system controller 200 from the reading unit 130 and the state of the request w2 is changed to RA. Along with the output of the request s1, because the transmission path from the reading unit 130 to the system controller 200 is made usable, among the waiting flags of the request w1, the waiting flag of the queue #0 corresponding to the request s1 is set to zero. The reading unit 130 reads and outputs the request w1 to the system controller 200. The status mentioned earlier is shown in FIG. 11.

Figure 12:
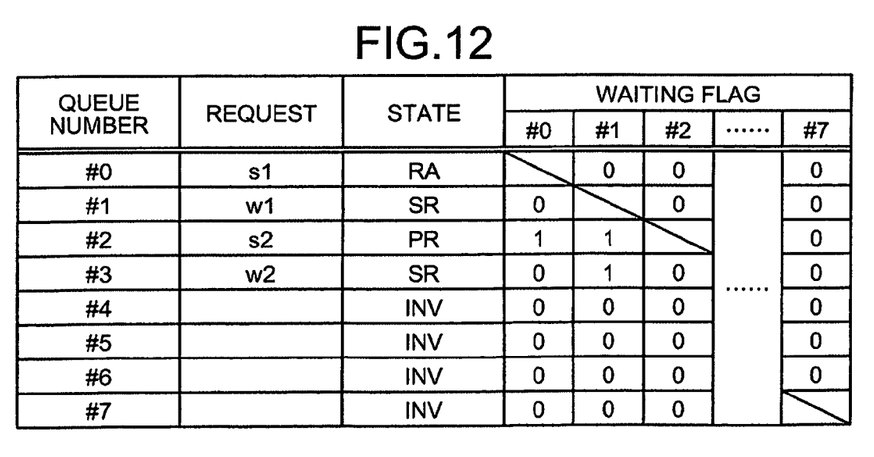

Because the request w2 does not need to await the completion of issuing of all the previous requests, the state of the request w2 is changed to SR. However, because the transmission path is occupied by the previous request w1, among the waiting flags of the request w2, the waiting flag of the queue #1 corresponding to the request w1 is set to 1. The status mentioned earlier is shown in FIG. 12.

Figure 13:
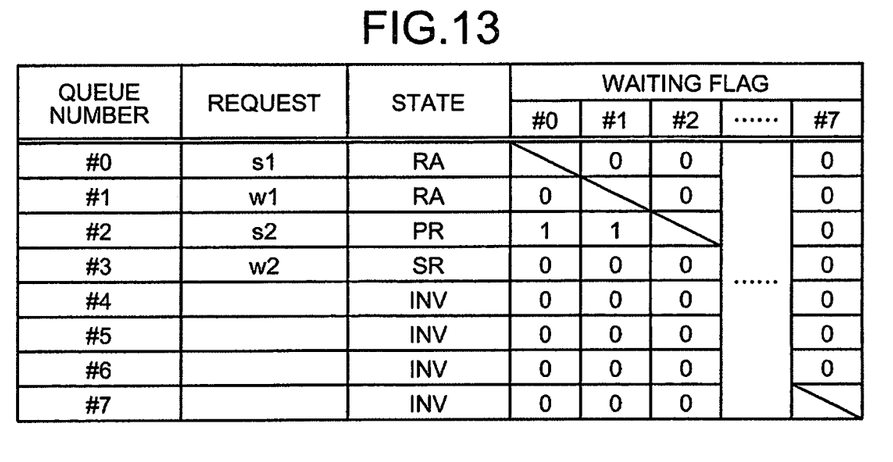

The request w1 is output from the reading unit 130 to the system controller 200 and the state of the request w1 is changed to RA. Along with the output of the request w1, because the transmission path from the reading unit 130 to the system controller 200 is made usable, among the waiting flags of the request w2, the waiting flag of the queue #1 corresponding to the request w1 is set to zero. The reading unit 130 reads and outputs the request w2 to the system controller 200. The status mentioned earlier is shown in FIG. 13.

Figure 14:
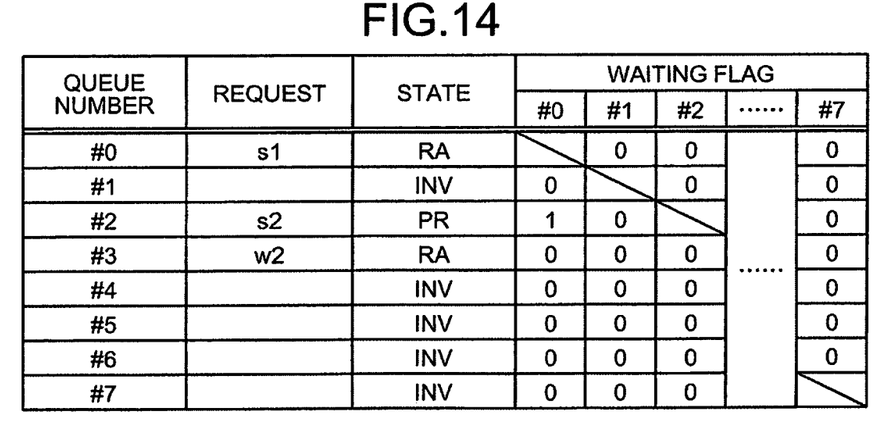

When the receipt response of the request w1 is returned from the system controller 200, the request w1 is invalidated and the state of the queue #1 is changed to INV. Along with changing the state of the queue #1, because the request s2 has awaited the issuing completion of the request w1, among the waiting flags of the request s2, the request flag of the queue #1 corresponding to the request w1 is set to zero. The request w2 is output from the reading unit 130 to the system controller 200 and the state of the request w2 is changed to RA. The status mentioned earlier is shown in FIG. 14.

Figure 15:
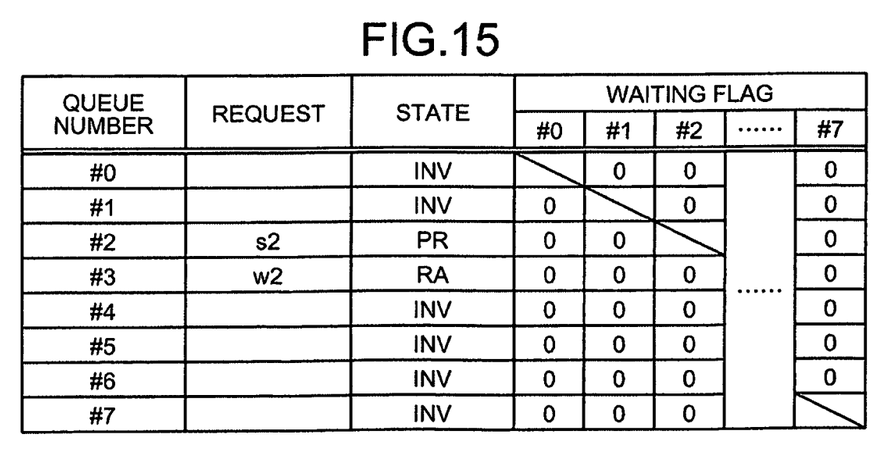

When the receipt response of the request s1 is returned from the system controller 200, the request s1 is invalidated and the state of the queue #0 is changed to INV. Along with changing the state of the queue #0, because the request s2 has awaited the issuing completion of the request s1, among the waiting flags of the request s2, the request flag of the queue #0 corresponding to the request s1 is set to zero. The status mentioned earlier is shown in FIG. 15.

Figure 16:
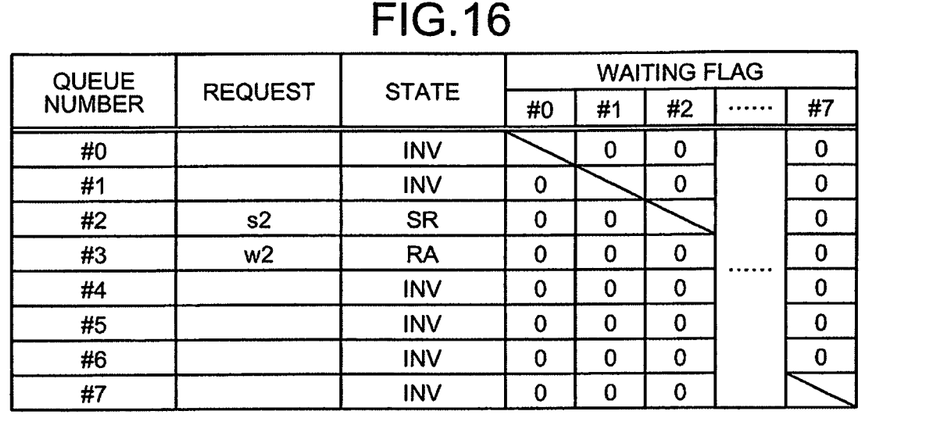

Because all the waiting flags among the waiting flags of the request s2 are set to zero, the state of the request s2 is changed to SR and the request s2 is output by the reading unit 130 to the system controller 200. The status mentioned earlier is shown in FIG. 16.

Figure 17:
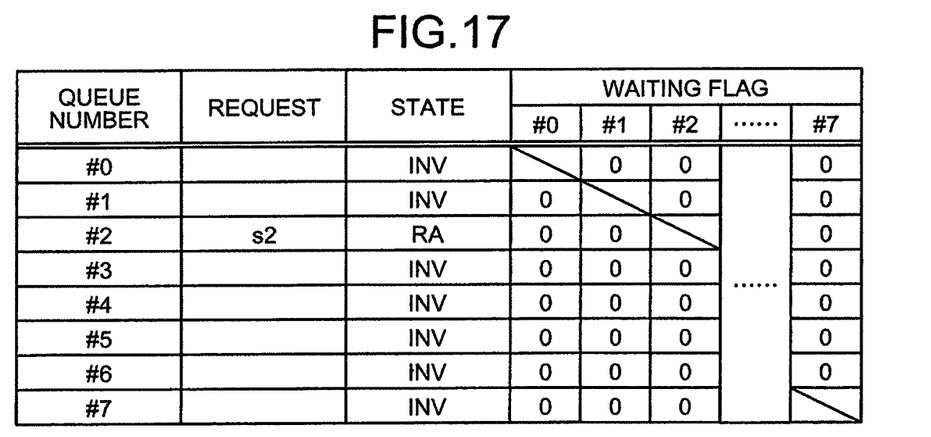

Next, when the receipt response of the request w2 is returned from the system controller 200, the request w2 is invalidated and the state of the queue #3 is changed to INV. Next, the request s2 is output from the reading unit 130 to the system controller 200 and the state of the request s2 is changed to RA. The status mentioned earlier is shown in FIG. 17.

Figure 18:
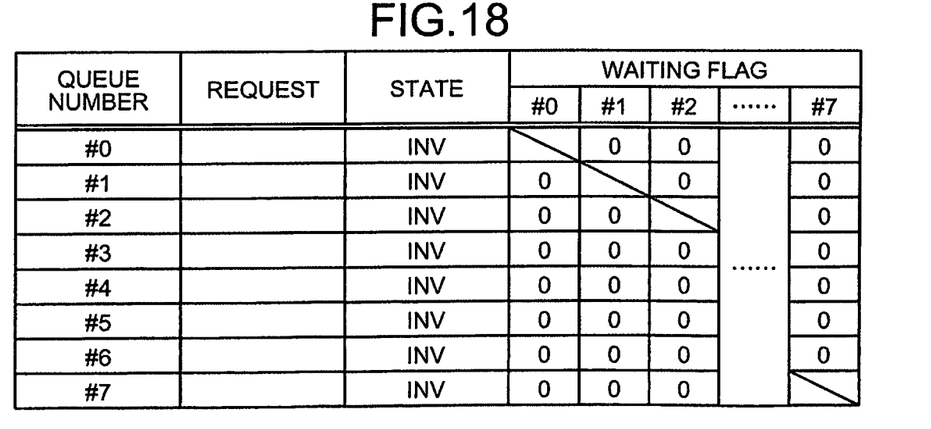

Finally, when the receipt response of the request s2 is returned from the system controller 200, the request s2 is invalidated and the state of the queue #2 is changed to INV. Thus, as shown in FIG. 18, all the queues #0 to #7 again become empty.

Thus, according to the present embodiment, a correspondence is established between each request and a waiting flag that indicates whether the request needs to await issuing of the requests corresponding to all the queues inside the buffer. The waiting flag of each request in the waiting flag is appropriately set according to the type of the request and a state change of the previous requests. The issuing target request is issued when all the waiting flags in the waiting flag of the issuing target request indicate that waiting is not necessary. Due to this, the multiple requests, which are written inside a single buffer, can be issued while exercising the necessary sequence control. Thus, process that necessitates the sequential guarantee and the process that does not necessitate the sequential guarantee can be executed on a small circuit scale.

Buffering in the I/O controller 100, which is connected to the system controller 200, is explained in the above embodiment. However, the present invention can also be applied to various buffers that necessitate the sequential guarantee and priority control. Furthermore, the sequence controller 140 can also control the table that is shown in FIGS. 7 to 18 to control a reading sequence of the reading unit 130 without adding any data to the data itself.

According to an embodiment of the present invention, regardless of whether a sequential guarantee is necessitated, even if data is mixed and stored at a single place, the data can be read in an appropriate sequence by referring to a waiting flag of each data. Thus, a process that necessitates the sequential guarantee and a process that does not necessitate the sequential guarantee can be executed on a small circuit scale.

According to another embodiment of the present invention, for the data, which is used for the process that necessitates the sequential guarantee, the waiting flag is set such that the data awaits a process completion of previous data. For the data, which does not necessitate the sequential guarantee, the waiting flag is set such that the data does not await the process completion of the previous data. Thus, a process delay can be minimized for any of the data.

According to still another embodiment of the present invention, for the data that necessitates the sequential guarantee, the next data can be read after the process completion of one data. Thus, a sequence can be reliably maintained.

According to still another embodiment of the present invention, for the data that does not necessitate the sequential guarantee, the next data can be read immediately when a transmission path of the data becomes usable. Thus, the process delay can be suppressed.

According to still another embodiment of the present invention, a correspondence between each data and the waiting flag can be clearly stored and the sequence of reading can be accurately controlled.

According to still another embodiment of the present invention, even if a response is received when the read data is being subjected to a process, a read timing of the data can be minutely controlled and the process delay can be further suppressed.

According to still another embodiment of the present invention, the waiting flag of the data, which necessitates the sequential guarantee, can be efficiently updated and a waiting period until reading of the data can be minimized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A buffering device that buffers data to be subjected to any one of a first process that necessitates a sequential guarantee and a second process that does not necessitate the sequential guarantee, the buffering device comprising:

a storage unit that includes a plurality of queues, each of which stores one target data to be processed and a state of the target data that is capable of changing in a sequence of waiting issuance of previous status, waiting issuance status, waiting response status and completing issuance status, and is further capable of storing a plurality of waiting flags of the target data, each of the plurality of waiting flags corresponding to one of the plurality of queues, wherein, the waiting issuance of previous status indicates issuing of a preceding target data is awaited, the waiting issuance status indicates issuing of the target data itself is awaited, the waiting response status indicates a receipt response to the target data is awaited, and the completing issuance status indicates issuing of the target data is completed;

a control unit that sets a waiting flag in a queue storing a specific target data, the waiting flag of the specific target data corresponding to a queue storing preceding target data that is to be processed before processing the specific target data; and a reading unit that reads the target data from the storage unit one by one based on the waiting flag set by the control unit, the control unit configured to set the waiting flag of a specific target data that is to be subjected to the first process such that a waiting flag corresponding to a queue storing the preceding target data in any status is set and the specific target data is allowed to be read when the state of the preceding target data becomes the completing issuance status in which issuing of the preceding target data is completed, while to set the waiting flag of a specific target data that is to be subjected to the second process such that a waiting flag corresponding to a queue storing the preceding target data in the state of the waiting issuance is set and the specific target data is allowed to be read when the state of the preceding target data becomes the waiting response status in which a receipt response to the preceding target data is awaited.

2. The buffering device according to claim 1, further comprising a writing unit that writes target data one-by-one to the storage unit, wherein the control unit appends data indicative of the waiting flag to a target data that is to be written to the storage unit by the writing unit.

3. The buffering device according to claim 1, wherein the control unit sets the waiting flag of the specific target data that is to be subjected to the first process or the second process according to the state stored in a preceding queue storing the preceding target data.

4. A method of buffering data to be subjected to any one of a first process that necessitates a sequential guarantee and a second process that does not necessitate the sequential guarantee, the method comprising:

storing a plurality of target data to be processed in a storage unit having a plurality of queues, each of which stores one target data to be processed and a state of the target data that is capable of changing in a sequence of waiting issuance of previous status, waiting issuance status, waiting response status and completing issuance status, and is further capable of storing a plurality of waiting flags of the target data, each of the plurality of waiting flags corresponding to one of the plurality of queues, wherein, the waiting issuance of previous status indicates issuing of a preceding target data is awaited, the waiting issuance status indicates issuing of the target data itself is awaited, the waiting response status indicates a receipt response to the target data is awaited, and the completing issuance status indicates issuing of the target data is completed;

setting a waiting flag in a queue storing a specific target data, the waiting flag of the specific target data corresponding to a queue storing preceding target data that is to be processed before processing the specific target data;

controlling an order of reading of the target data based on the waiting flag set corresponding to the target data; and reading the target data one-by-one to output in the order controlled at the controlling, the setting including setting the waiting flag of a specific target data that is to be subjected to the first process such that a waiting flag corresponding to a queue storing the preceding target data in any status is set and the specific target data is allowed to be read when the state of the preceding target data becomes the completing issuance status in which issuing of the preceding target data is completed, and setting the waiting flag of a specific target data that is to be subjected to the second process such that a waiting flag corresponding to a queue storing the preceding target data in the state of the waiting issuance is set and the specific target data is allowed to be read when the state of the preceding target data becomes the waiting response status in which a receipt response to the preceding target data is awaited.

5. The method according to claim 4, wherein the setting includes setting the waiting flag of the specific target data that is to be subjected to the first process or the second process according to the state stored in a preceding queue storing the preceding target data.

* * * * *